US012352884B2

(12) United States Patent
Raz et al.

(10) Patent No.: US 12,352,884 B2
(45) Date of Patent: Jul. 8, 2025

(54) OUTDOOR WIRELESS GUNSHOT LOCATING SYSTEM FOR SECURING SITED ASSETS

(71) Applicant: EAGL Technology, Inc, Albuquerque, NM (US)

(72) Inventors: Boaz Raz, Albuquerque, NM (US); Clay Davidson, Bonifay, FL (US); Everett Robinson, Albuquerque, NM (US)

(73) Assignee: EAGL TECHNOLOGY, INC., Albuquerque, NM (US)

( * ) Notice: Subject to any disclaimer, the term of this patent is extended or adjusted under 35 U.S.C. 154(b) by 92 days.

(21) Appl. No.: 18/371,114

(22) Filed: Sep. 21, 2023

(65) Prior Publication Data
US 2025/0102615 A1    Mar. 27, 2025

(51) Int. Cl.
*G01S 5/30* (2006.01)
*F41H 11/00* (2006.01)

(52) U.S. Cl.
CPC ............ *G01S 5/30* (2013.01); *F41H 11/00* (2013.01); *G01S 2205/07* (2020.05)

(58) Field of Classification Search
None
See application file for complete search history.

(56) References Cited

U.S. PATENT DOCUMENTS

| 5,241,518 | A | 8/1993 | McNelis et al. |
| 8,050,141 | B1 | 11/2011 | Carroll et al. |
| 8,487,755 | B2 * | 7/2013 | Gudgel .................. H04L 67/52 340/539.1 |
| 8,730,062 | B2 | 5/2014 | Eldershaw et al. |

(Continued)

FOREIGN PATENT DOCUMENTS

| AU | 2004207239 A1 * | 8/2004 | ............. F41H 11/00 |
| EP | 1528410 A1 * | 5/2005 | ............. F41H 11/00 |

(Continued)

OTHER PUBLICATIONS

Wikipedia, online at https://en.wikipedia.org/wiki/Gunfire_locator, last accessed Aug. 15, 2023.

(Continued)

*Primary Examiner* — Fekadeselassie Girma
(74) *Attorney, Agent, or Firm* — Rod D. Baker (57) ABSTRACT

Disclosed herein are wireless networks of gunshot detector arrays providing the firing location and trajectory of a gunshot, while being tolerant of clock drift among the network. Individual gunshot detectors may be battery-powered employing one or more microphones. Detectors may time-synchronize infrequently to conserve power. Detectors may communicate wirelessly to a central device that evaluates gunshot candidates, associates those candidates between detectors to individual gunshot events, and performs calculations to arrive at a solution for a gunshot direction and/or origin. Combinations of contemporaneous gunshot candidates may be reviewed for a best positional solution. The location of gunshot events may be displayed on an overhead image or map, to persons providing remedial actions, optionally with trajectories and potential zones of impact and damaged assets.

25 Claims, 7 Drawing Sheets

(56) References Cited

U.S. PATENT DOCUMENTS

| | | | |
|---|---|---|---|
| 8,995,227 B1 | 3/2015 | Johnson | |
| 9,164,165 B2* | 10/2015 | Mattern | G08B 21/02 |
| 10,089,845 B2 | 10/2018 | Skorpik et al. | |
| 10,657,800 B1 | 5/2020 | Fowler et al. | |
| 10,830,866 B1 | 11/2020 | Onofrio et al. | |
| 10,930,125 B1 | 2/2021 | Alonzo, III et al. | |
| 11,282,353 B1 | 3/2022 | Fowler et al. | |
| 11,282,358 B1 | 3/2022 | Fowler et al. | |
| 11,417,183 B1 | 8/2022 | Onofrio et al. | |
| 11,519,696 B2 | 12/2022 | Smith | |
| 11,538,330 B2* | 12/2022 | Raz | G01H 3/06 |
| 11,600,166 B1 | 3/2023 | Trepanier et al. | |
| 11,604,248 B1 | 3/2023 | Onofrio et al. | |
| 11,681,007 B2 | 6/2023 | Griggs et al. | |
| 11,688,414 B1* | 6/2023 | Onofrio | G08B 13/1672 367/128 |
| 11,887,468 B2* | 1/2024 | Williams | G08B 7/066 |
| 12,230,050 B2* | 2/2025 | Merchant | G06V 20/52 |
| 2002/0003470 A1* | 1/2002 | Auerbach | F41H 11/00 340/425.5 |
| 2004/0170015 A1* | 9/2004 | Hamrick | G08B 7/062 362/812 |
| 2006/0161339 A1* | 7/2006 | Holmes | G01S 5/0027 367/128 |
| 2008/0165047 A1* | 7/2008 | Fisher | G01S 19/03 342/45 |
| 2008/0298176 A1* | 12/2008 | Fisher | F41H 13/00 367/125 |
| 2012/0177219 A1 | 7/2012 | Mullen et al. | |
| 2012/0182837 A1* | 7/2012 | Calhoun | G01S 5/20 367/127 |
| 2016/0157032 A1* | 6/2016 | Kane | G08B 29/185 381/56 |
| 2016/0209390 A1 | 7/2016 | Overcast | |
| 2016/0232774 A1* | 8/2016 | Noland | G08B 25/10 |
| 2019/0080577 A1* | 3/2019 | Raz | G01H 3/10 |
| 2019/0212186 A1* | 7/2019 | Warren | H04R 29/00 |
| 2019/0295207 A1* | 9/2019 | Day | G09F 13/005 |
| 2019/0295397 A1* | 9/2019 | Eckert | G08B 5/36 |
| 2020/0402378 A1* | 12/2020 | Connell, II | H04W 4/029 |
| 2021/0289168 A1 | 9/2021 | Gluckert et al. | |
| 2022/0051548 A1 | 2/2022 | Pellegrini et al. | |
| 2022/0057519 A1 | 2/2022 | Goldstein et al. | |
| 2022/0383728 A1 | 12/2022 | Brown | |
| 2022/0408180 A1 | 12/2022 | LePoutre et al. | |
| 2023/0324496 A1 | 10/2023 | Griggs et al. | |
| 2023/0394946 A1* | 12/2023 | Wells | G08B 13/1672 |
| 2023/0408226 A1* | 12/2023 | Giordano | F41H 5/24 |
| 2024/0161590 A1* | 5/2024 | Kronish | G08B 25/007 |

FOREIGN PATENT DOCUMENTS

| | | | |
|---|---|---|---|
| JP | 7160607 B2 | * | 10/2022 |
| JP | 7242196 B2 | * | 3/2023 |
| TR | 201303744 A2 | * | 10/2014 |

OTHER PUBLICATIONS

U.S. Dept. of Homeland Security, "Gunshot Detection Systems", Dec. 2022.

Electronic Frontier Foundation, "Acoustic Gunshot Detection", online at https://www.eff.org/pages/gunshot-detection, last accessed Aug. 30, 2023.

QinetiQ Inc., "EARS Wireless Fixed Site Gunshot Detection System", 2021, Waltham, MA, US.

* cited by examiner

OUTDOOR WIRELESS GUNSHOT LOCATING SYSTEM FOR SECURING SITED ASSETS

BACKGROUND

The problem of securing assets of various kinds in and adjacent to open spaces from gunfire is a long-standing problem. There are assets of all kinds that are exposed and potentially damaged by incoming fire, from a malicious and sometimes concealed actor located sometimes hundreds of meters away beyond the reach of lighting, cameras and other surveillance. The cost of installing shielding around an asset can be impractical, especially where the asset is mobile or consists of people seeking an aesthetic view.

Gunshot detection systems are known in the art, which sense the emissions of a gunshot at a sensor, and preferably discriminate between gunfire and other related sounds. Most often a sensor of these systems incorporates microphones that detect audio events, such as the "crack" of the discharge of a gun. Some systems also include a camera that detects muzzle flash. A number of ways of detecting a gunshot are known, in both indoor and outdoor environments.

With most current gunshot sensor types, the source of gunfire can be known only within the rough detection range specific to the sensor type. A gunshot sensor having a 200-meter range leaves a hemisphere that would encapsulate most of a common city block. Thus mere detection of a gunshot usually leaves a peace officer or other emergency interdictor with a large area to cover when time is short to protect people and assets in the area and apprehend likely suspects.

Convention gunshot locating systems utilize arrays of microphones, triangulation and use the "time difference of arrival" at two or three sensors to arrive at a solution for the location of the shooter. Depending upon atmospheric conditions present, the speed of sound is about 340 meters per second. To obtain good coverage, a sensor array cannot be spaced at too large a distance, typically not more than 25-100 meters to ensure a gunshot is reliably detected at more than one sensor. This results in the difference in time between arrivals at a fraction of a second. As a consequence, in conventional systems the timestamps for a gunshot event must be to a carefully synchronized common clock. Past systems achieve this by connecting each sensor to a wire, that supplies both power and low-latency communication. Thus modern gunshot location systems generally require the running of wires to each sensor in the array, and the cost of digging, conduiting and other problems associated with installation and maintenance of such systems are likely the reason these have not been widely adopted.

Wireless gunshot sensors are available and can overcome the burdens of installing wired sensor arrays. Being wireless, these devices must usually operate in power-saving "sleep" modes to avoid battery depletion and consequently the need to replace batteries weekly or monthly to avoid the unavailability of parts of a gunshot sensor network. The device will operate at high power when transmitting, but the duration and frequency of this is kept low. To achieve reasonable cost of electronics while maintaining low power consumption, a sensor may incorporate a microcontroller with a low clock rate and an RC-type of oscillator. This kind of oscillator is susceptible to process variations in the integrated circuit manufacturing, which results in a loss of accuracy to any incorporated real-time clock. Thus with currently-available technologies, it is generally not possible to have all of low-power, a highly-accurate clock and low cost.

Recognizing that technologies will sometimes evolve beyond the constraints presently known, the above background statements are to be interpreted only to provide context to the discussion that follows.

BRIEF SUMMARY

Disclosed herein are wireless networks of gunshot detector arrays providing the firing location and trajectory of a gunshot, while being tolerant of clock drift among the network. Individual gunshot detectors may be battery-powered employing one or more microphones. Detectors may time-synchronize infrequently to conserve power. Detectors may communicate wirelessly to a central device that evaluates gunshot candidates, associates those candidates between detectors to individual gunshot events, and performs calculations to arrive at a solution for a gunshot direction and/or origin. Combinations of contemporaneous gunshot candidates may be reviewed for a best positional solution. The location of gunshot events may be displayed on an overhead image or map, to persons providing remedial actions, optionally with trajectories and potential zones of impact and damaged assets. Detailed information on various example embodiments of the inventions are provided in the Detailed Description below, and the inventions are defined by the appended claims.

DETAILED DESCRIPTION

Reiterating some of the background discussed above, the design of gunshot detection systems have matured in recent years, to the point that a gunshot sensor can be affixed in place and provide indication that a gunshot has likely been fired. See, for example, the detector system of U.S. Pat. No. 11,538,330 to Raz et al. (hereinafter the "'330 Patent"), hereby incorporated by reference in its entirety. Some attempts have been made to add direction information to a gunshot event, in past systems through triangulation and use the "time difference of arrival" at two or three sensors to arrive at a solution for the location of the shooter. Because these systems require constant monitoring of audio microphones, these have required a sensor to be constantly powered-on. This has constrained the use of these systems to wired installations through which power can be delivered, or battery-powered installations with short lifespans and high maintenance burdens.

Figure 1:
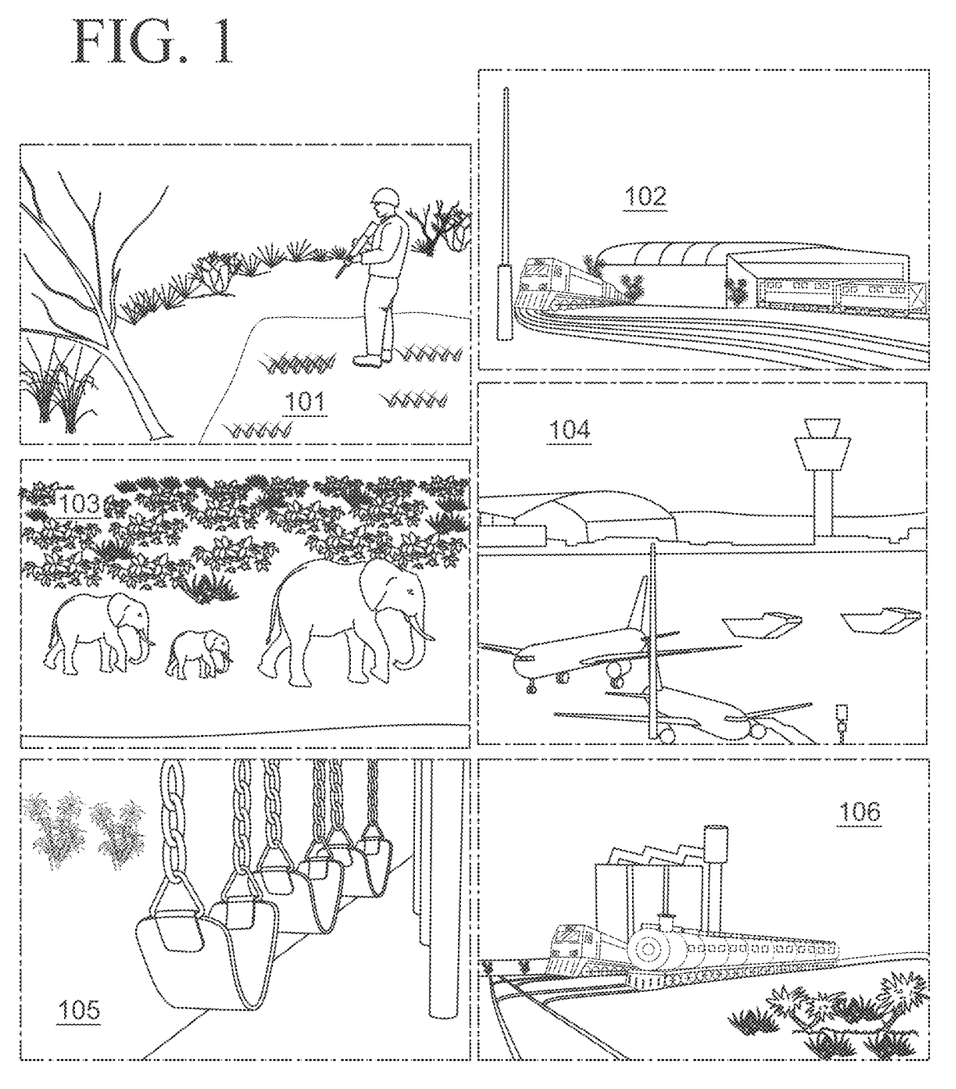
FIG. 1 shows a number of exemplary sites and environments where wireless gunshot detectors may be employed.

Now speaking to the environmental uses shown in FIG. 1, a main use of gunshot direction finders has been in combat zones, with a sensor array entirely mounted to a vehicle, usually on the roof, or sometimes mounted to a soldier's helmet. These systems have advanced to the point that a vector can be found from the vehicle's location as a point of origin, identifying to the passengers where to direct their attention and where cover might be found. These systems may provide momentary locating information for the immediate area around a moving vehicle or soldier, but are not effective for monitoring large areas 101, particularly if they are unoccupied. Large areas captured in the course of military operations make running cables impractical, hence gunshot location systems have not seen use in these large, open areas.

Infrastructure of many times are susceptible to damage from vandalism, at hundreds of meters from common firearms. Examples of such infrastructure are warehouses, piers, and railyards 102. Even where large buffers surround such infrastructure, and even where it is surrounded by fencing and security lighting, infiltration by a malicious actor is relatively easily done within range of a rifle. Once damage is caused, the owner or maintainer of the infrastructure has little information to where that damage might have been done, leaving potential undiscovered hazards and long-term leakage and spoilage.

Having location information of gunshots near zoos and wildlife preserves 103 can help to identify locations of entry and concealment, and assist in the collection of evidence.

The large, open-areas of airports 104 are of particular concern. Damage from a round to an aircraft can create a flight hazard and loss of equipment and life through no less than loss of pressure, and damage to hydraulic and control systems. Interested parties have an urgent need to know not only whether gunshots have been fired in the area, but also which aircraft were downrange and require further inspection. The installation of wires across an airfield is impractical, due to trenching operations, conduiting, locating crews in operational areas, and otherwise causing interruptions in traffic.

Playgrounds, schoolyards, fairgrounds and other public places 105 where people frequent benefit from having not only an alert when a gunshot has been fired, but also where the shooter is located for interdiction and where rounds likely impacted for medical first-responders. Knowing the source and trajectory of a round also aids in the collection of shell casings and other evidence for prosecution.

The environments of petroleum processing facilities, pipelines, flammable gas containers, containers of corrosive and reactive chemicals, and transfer depots of such materials 106 are a final example given here, where knowledge of the location of potential shot impacts and damage can be critical to know. Many such locations are unattended at least part of the day, with no one to observe the gunfire source and zones of impact, for which mere gunshot detectors provide little protection. The possibility of sparking an inferno, environmental contamination and personnel hazards from leaking or malfunctioning equipment can be mitigated with the assistance of systems as disclosed herein.

These asset-bearing environments and many more provide examples where existing gunshot detection and location systems do not provide practical coverage.

Exemplary Gunshot Detection Implementations

Figure 2:
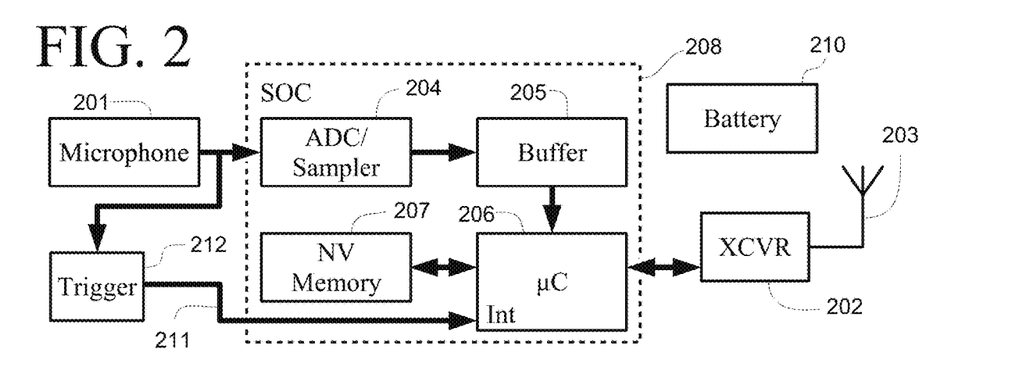
FIG. 2 shows the components of an exemplary audio-sampling wireless gunshot sensor.

Now turning to FIG. 2, the elements of a exemplary wireless gunshot sensor suitable for incorporation into an array of a gunshot locator and trajectory system are shown. In a sentence, the basic function of this sensor is to sample microphone 201 and, upon the detection of a gunshot candidate, produce information about the audio received at the microphone to transceiver 202 for transmission over antenna 203 to a receiving wireless device over its own antenna and transceiver. Many wireless protocols and schemes can be used, including but not limited to LORA, LORAWAN, Zigbee, Z-Wave, Bluetooth, and 802.11 in its many versions. Low-power wireless and IoT protocols are preferred to maximize battery life. This sensor may also incorporate features to receive information from remote devices, such as configuration or the waveforms of other sensors, but that is not required in a basic system. Microphone 201 is preferably mounted close to ports in whatever enclosure is used, ensuring the efficient transfer of sound from the outside. Accordingly the microphone and other components are preferably designed to withstand exposure to humidity, temperature extremes and other weather conditions. To make the calculations described below easier, microphone 201 can be omnidirectional, however directional microphones can be used with appropriate calibrations a the time locations are calculated. This sensor incorporates analog-to-digital sampler (ADC) 204, providing a stream of regular audio samples into a buffer 205. Upon the accumulation of a sufficient number of samples, a microcontroller 206 performs processing on those samples, which processing continues for a short period as gunshot candidate audio information is produced and transmitted. In this context, a microcontroller is a processing unit capable of entering a low power mode, and although many devices with limited memory, physical size and clock rates are commonly known as "microcontrollers", this should be read to encompass a wide scope of computing devices including logic state machines and processors suitable for desktop applications. Instructions for microcontroller 206 are stored an a non-volatile memory 207, common examples of which are Flash, PROM and EEPROM. Non-volatile memory may also contain audio fingerprints and other information for filtering and discarding poorly-matching gunshot candidates, for example short transients from EMI and physical strikes on the housing. Components are encapsulated in a system-on-chip (SOC) 208 as known in the art. The components within the SOC can vary, for example some integrated circuits include a transceiver, and other SOCs may be designed for an external audio sampling chip. The microphone 102 and battery 210 are customarily external to the SOC on a wireless device.

Being powered by a battery 210, most of the time microcontroller 206 operates in a low-power "sleep" mode, not executing instructions and consuming power. Likewise transceiver 202 is kept unpowered until needed, that is when a gunshot candidate is to be transmitted and for other infrequent housekeeping activities with remote devices, such as those described in the '330 Patent. SOC includes an interrupt line "Int", connected to a trigger line 211, which is set to wake up microcontroller 206 when an audio signal at some level beyond the background range is detected. In this example, a trigger 212 produces an edge on interrupt line 211 when the microphone voltage is sufficiently distant from the normal. When awakened, microcontroller 206 processes incoming audio, optionally applies filters, optionally compresses the audio stream, transmits information derived from the gunshot candidate, and goes back to sleep.

Figure 3:
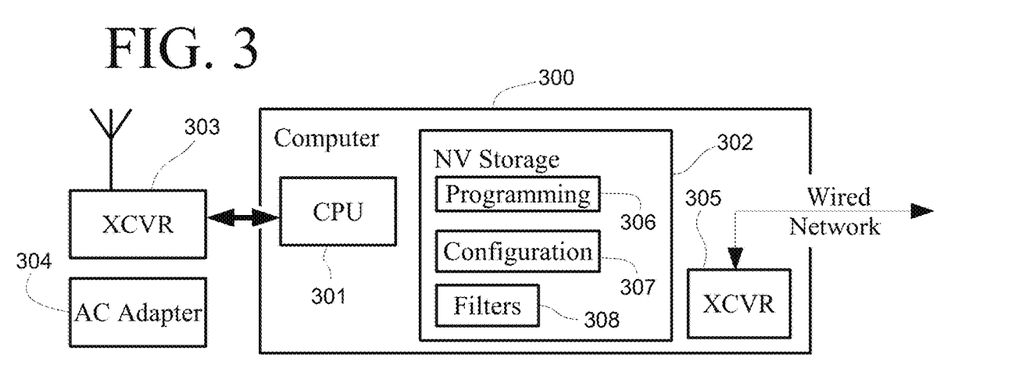
FIG. 3 shows the components of an exemplary central device for receiving gunshot candidates from gunshot sensors.

FIG. 3 shows elements of an exemplary central device that can receive gunshot candidate information from wireless sensors. This central device preferably includes a weather-resistant enclosure so that it may operate in a wide variety of locations, such as indoors, inside outdoor utility structure or shelter, or mounted high on a building wall or pole to increase the reliability and/or range of the wireless link with sensors. The exemplary central device incorporates a computer 300, with a CPU 301 and non-volatile memory 302. Computer 300 may be a conventional "off the shelf" computer, or may be custom-built for the needs of an application or site, including single-board computers, headless computers, microcontroller systems, or ones reduced down to essential components. A wireless transceiver 303 provides communication with wireless sensors, which can be receive-only in basic systems, or bi-directional in more sophisticated forms. The placement of a central device must be within wireless range of attached sensors for a system including these to be fully-functional. In this example, the central device is powered through an AC adapter 304, but where AC power is not available or convenient, battery-power or other source may also be used. This central device also includes a transceiver 305 for wired network access over a LAN or WAN. In another alternative, transceiver 305 uses a UART or other point-to-point link. Transceiver 305 is selected to serve whatever wired network is available at the site, including but not limited to Ethernet, fiber-optic, RS-232, Modbus, and SNMP. In an alternative implementation, transceiver 305 is wireless, providing communication over a WiFi, satellite, unidirectional, directional line-of-sight or other form, including whatever antennas, dishes and cabling match the installation, as will be understood by a person of ordinary skill.

NV memory 302 is accessible by CPU 301, and its content includes programming 306, configuration 307, and filters 308. Programming 306 may optionally include an operating system, also including instructions executable by CPU to perform the functions of a gateway. Programming 306 may also include a user interface, for example over an HTTP server or attached terminal, by which gunshot events can be observed, and the central device controlled. Configuration 307 may include such things as a list of attached sensor IDs, encryption passwords and credentials, and other controlling information for the central unit and the attached sensor array. In this example, configuration 307 also includes the geospatial location of nearby sensors, which may include cartesian coordinates on a map from a selected origin, GPS coordinates, compass bearing and distance, or other convenient form. Other items may be added to memory 302 as desired. Filters 308 are included providing tests by which central device 300 can apply more processor-intensive tests against false alarms than can or are elected not to be done at attached low-power wireless sensors. Filters 308 may be implemented as data patterns for a pattern recognizer, as collections of waveform thresholds and limits, as processor instructions callable or includable in programming 306, and in many other forms.

In terms of battery consumption at a sensor, there is a tradeoff between processing waveforms and transmitting large quantities of audio data. With the object of keeping batteries reasonably small, it may be preferred that the raw audio samples are not communicated over a wireless link in ordinary operation, so as to minimize the power consumption of the transmitter portion of transceiver 202 and efficiently use the bandwidth available on the wireless channel. On the other hand, performing high processing at a sensor will also deplete a battery, running a classifier or comparing a waveform against a sequence of audio fingerprints. It is therefore reasonable to do some simple compression at the sensor, distilling an interval of thousands of audio samples down to what will fit in one or a few wireless packets. Indeed, compression of the audio stream can be extreme, down to the point that only accumulated energy during defined filter periods is communicated. Once a gunshot candidate is reported, the microcontroller 206 and/or SOC 208 will generally enter a low-power sleep mode, awaiting the arrival of the next potential gunshot audio event.

Timestamps applied to gunshot and time synchronization between such sensors and central devices are optional, as will become clear from the further discussion below.

Figure 4:
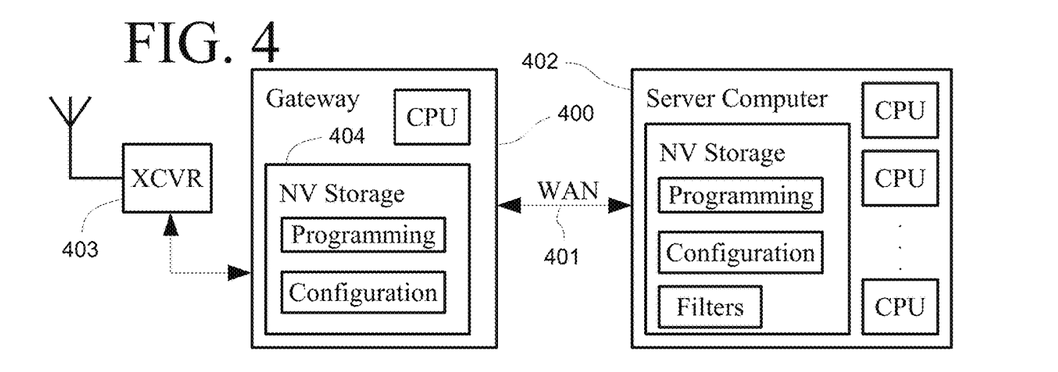
FIG. 4 shows the elements of a second exemplary central device having a local gateway and a potentially remote server.

Now turning to FIG. 4, alternatives to an on-site central device containing all of the elements shown in FIG. 3 may be made, including the alternative of performing filter processing remotely from the monitored site, sometimes referred to as "in the cloud." Central device 400 acts as a gateway for attached sensors, transferring gunshot candidate information over a wide-area network 401 to a server 402. Network 401 can be an-entity specific network, the Internet, or any other providing communication with remote servers 402. In this example, gateway 400 omits filters 308, moves them to server 402 where false-alarm processing is done. Calculations of location and trajectory likewise be done at a central device or a server, as convenient. Otherwise exemplary gateway 400 includes much the same components as the central device of FIG. 3, including wireless transceiver 403 and non-volatile memory 404 storing configuration and programming. Server computer 402 may be a traditional physical server, may be implemented as a virtual machine running in a processing cluster, a plurality of local or remote interconnected servers, and many other forms.

In yet another alternative, a central device is omitted entirely, made possible by individual gunshot detection sensors having a transceiver capable of long-distance communication, for example through a cellular module. Communication may be by way of an Internet IoT protocol, for example MQTT. In this configuration the server 402 may integrate the functions of the central device, replacing transceiver 305 with long-range network infrastructure, for example through a cellular or a satellite channel.

Introduction to Gunshot Candidates and "Energy" Waveform Processing

Figure 5:
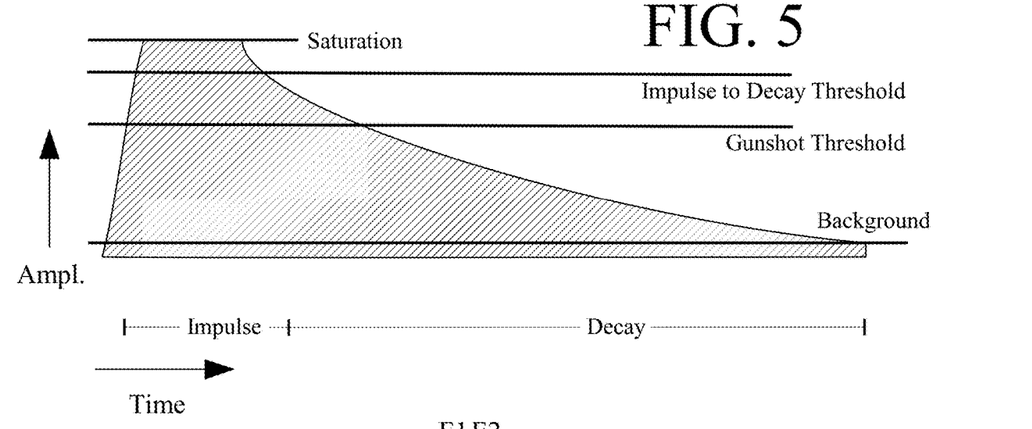
FIG. 5 illustrates a typical audio energy envelope received at a sensor from a gunshot in connection with various intervals and thresholds.

The waveform of FIG. 5 is representative of the envelope of the signal sampled at a microphone following the nearby firing of a gun. Calculation of the amplitude of the envelope may be done in a number of ways, one of which is basically to take the sum of the absolute values at the ADC sampler over a window of n samples, e.g.:

$$\text{amplitude}_t = \text{abs}(S_t) + \text{abs}(S_{t+1}) + \ldots \text{abs}(S_{t+n})$$

where S is a sequence of audio samples from the ADC, t is the time index of the amplitude. The number n may be selected to be small enough to preserve enough high-frequency information for filtering, yet large enough to discard zero-crossings and background and electronic noise. The pre- and post-application of low-pass filters, high-pass filters and other refinements can be made according to the sampling frequency, weapon types, the operational environment and other factors, as will be understood by a person of ordinary skill, particularly in view of the '330 Patent, but the method above is sufficient to develop a conceptual understanding for the discussion below. The term "energy" herein means the accumulation of amplitudes or the sign-indifferent sample values in a specific time period or combination of periods within a gunshot candidate envelope, representing the magnitude of the disturbance of a gunshot to the atmosphere surrounding a sensor over those period(s).

The representative gunshot waveform of FIG. 5 can be subdivided into two parts, which are an impulse and a following decay. The impulse will arise from the shock wave at the barrel, and may also include reflections and ringing therefrom. Note that the impulse shown may be much shorter as observed; it is visually exaggerated here for discussion's sake. The microphone is preferably designed to keep saturation to a minimum, to increase the accuracy of the energy measurement. The impulse portion will vary in length and will depend upon the initial pressure wave from the muzzle, and sound reflections from the ground and nearby objects. It will also depend upon the strength of the initial impulse/shock wave, which will depend upon the firing gun and its caliber and ammunition charge. A sensor may measure the energy of an impulse at a beginning and end in time designed to be most accurate for a variety of expected firearms and conditions, which may be arrived at with experimentation and tuning with the particular microphone system used. The amplitude of the decay portion of a waveform will generally roll-off at an inverse exponential rate down to that of the background noise in the environment, which may take a time ranging from about 100 milliseconds to several seconds.

Looking back again at FIG. 3, a trigger 212 may be present that awakens the gunshot detector when the raw voltage amplitude reaches a reference voltage level. At that point, the microcontroller 206 awakens and begins sampling, building and reviewing the envelope of what becomes a gunshot candidate. A gunshot threshold may provide initial discrimination of audio events that are too small to provide useful information, and the sensor may discard the candidate and not spend power in corresponding wireless transmissions. Other filtering may be applied at the sensor, as discussed in the '330 Patent.

The energy of a gunshot can be calculated in a number of ways. A simple way is to capture the accumulated amplitude in a defined and fixed period at the beginning of the envelope where the contribution to the amplitude is most likely to be from the gunshot, and changes to the amplitude are likely to be captured within the resolution of the sampler. This is reasonably accurate for candidates that don't remain in saturation too long. Another method captures the amount of time (or samples) where the amplitude remains above a threshold, which could be the gunshot threshold of FIG. 5, for example. Another method is to take the energy at a set time after the gunshot threshold is exceeded, i.e. when a gunshot candidate is first detected at the sensor, the set time being devised to be in the decay period of the envelope. Combinations of these may be employed, as well as other methods for arriving at a value for the energy in a gunshot candidate.

Now referring to FIG. 6, the position of a gunshot can be estimated using the energy values from the envelopes captured by two sensors as follows. First, the amplitude of sound generally follows the inverse-square law. Conceptually stated, in an open space, a sound measured at a distance will be four times as loud as the same sound at twice the distance. With a sensor S1 as positioned as shown will have an arc 611 where a gun of a particular caliber and ammunition will produce a certain energy value. The same gun and ammunition will produce an energy about one-quarter that value at arc 621 at double the distance. This relationship continues at varying distances to the effective range of the sensor 631. The same holds for an identical sensor S2 and arcs 612, 622 and 632. Now that description is somewhat oversimplified, because the energy received is also affected by attenuation by the ground as well as objects near the line-of-sight between a gunshot and the sensor. Strength and distance calculations can be modified to reflect real-world curves that relate distance to energy attenuation. Calibration sets can be used in tables common to all sensors with reasonable improvement. Additionally sensor microphones and circuitry can vary from unit to unit. Therefore the estimations of distance can be improved by performing calibrations between sensors, and for sensors as they are placed in their installation positions. For the sake of keeping this discussion brief, these kind of corrections to individual sensors will be assumed for high-precision installations and not mentioned again.

Returning to FIG. 6, the position of a gunshot can be estimated using the energy values received from two unidirectional sensors. Being equidistant from sensors S1 and S2, shot at location G1 will produce a similar energy envelope and energy values En that are substantially equal 641. Note that similar energy values does not supply enough information to accurately identify a weapon type nor the distance from the sensors, more than a suggestion. A gunshot G2 closer to sensor S1 will yield a larger energy value E1 than the energy value E2 for sensor S2. A third gunshot G3 located near S2 but at the reach of the range of S1 will produce a large energy E2 with a much smaller energy E1. This relationship between the energy values from two sensors indicates an arc or curve from which the gunshot originated. For example, the ratio of energy values 642, E1 to E2, determines an arc 630 where gunshot G2 originated from, but not the point of the gunshot itself.

Figure 7:
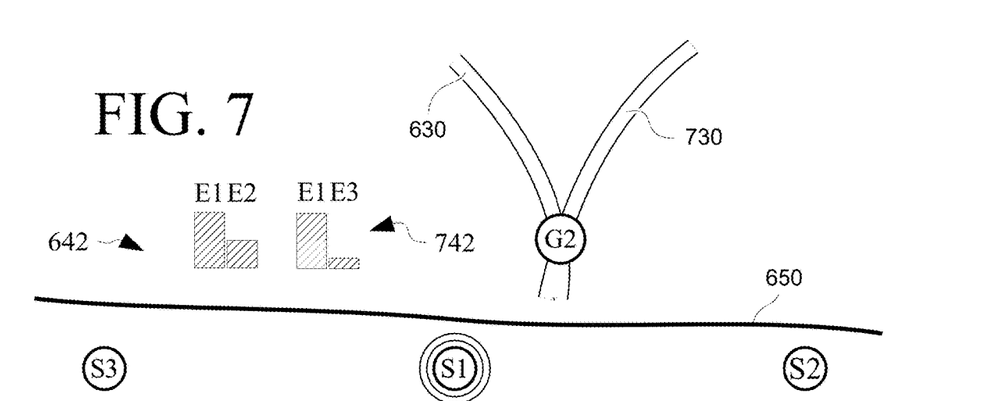
FIG. 7 illustrates the derivation of a point gunshot location using audio energy values received at three sensors.

Now referring to FIG. 7, the location of a gunshot can be brought down to a point through an additional energy value received at a third sensor. Here, a third sensor S3 has captured a gunshot candidate from gunshot G2, and calculated a corresponding energy value E3. The greatest energy value was received by S1, indicated by the double circle. Comparison of the energy values from S1 and S3 742 yields another ratio, which determines a further arc or curve 730. Although it is generally preferred to use greater energy values at sensors at a substantial relative distance to increase accuracy, a comparison between E2 and E3 can also yield a supplemental arc. The location where curves from two pairs of sensors intersect, here 630 and 730, will generally identify the location of the gunshot. Note that there may be two possible intersections to a pair of such curves. A line 650 of demarcation between a controlled/monitored area and an unmonitored area (discussed below) can single out the intersection likely to be the true origin of the gunshot, as the location of the intersection in the controlled area may be safely ruled out. In an alternative method, there is no line of demarcation, but rather the energy value from a fourth sensor is used to determine a third curve and single out the point of origin. In a further alternative method, the energy value from a fourth sensor is used to confirm or qualify the gunshot location in the uncontrolled area. Energy information can be used from a third or other additional sensor, even if the candidate received therefrom was processed by system filters and rejected as a gunshot.

Figure 6:
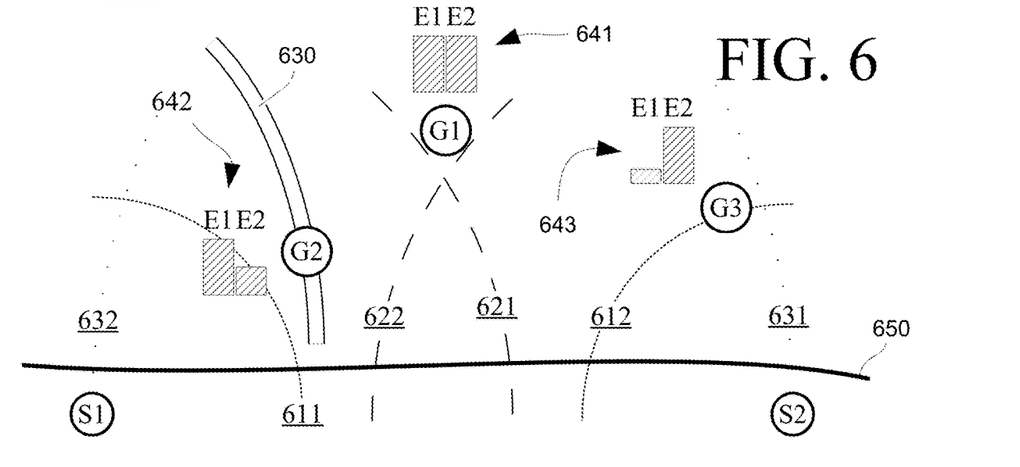
FIG. 6 illustrates from an overhead view the relationship of audio energy values received at gunshot sensors from various locations.

In the methodology of FIGS. 6 and 7, and in a system extending sensor battery life, communication of the energy values alone are sufficient to calculate the location of a gunshot by central processing, at varying calibers and weapon-types. Thus in a preferred embodiment, sensors such as S1-Sn are configured to transmit the energy values of a gunshot candidate along with minimal additional information, without transmitting the raw audio samples or the complete envelope. A gunshot candidate may include further information about specific points in an energy envelope, which can aid in the identification of a weapon or ammunition type.

Installations

Figure 8:
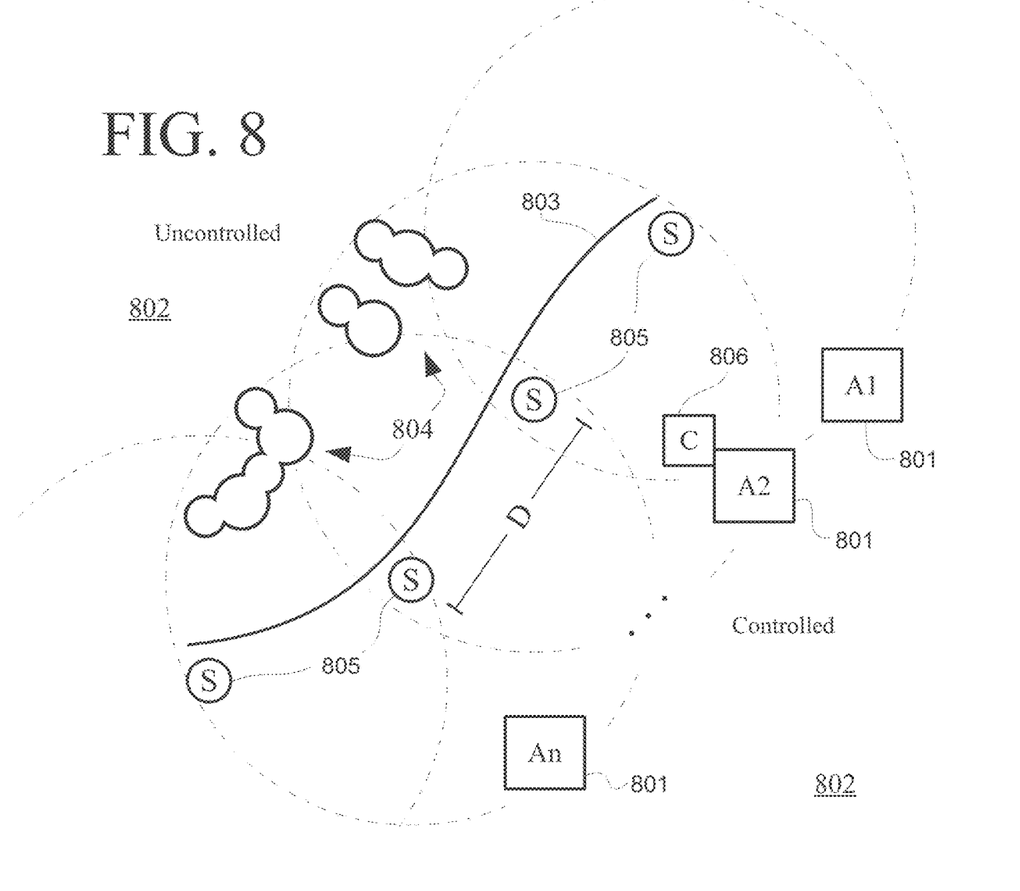
FIG. 8 depicts from an overhead view an exemplary installation of a gunshot sensor array at a demarcation line between an uncontrolled area and a controlled area containing assets.

FIG. 8 conceptually shows an exemplary installation of a sensor array and associated components and infrastructure, from a geospatial view. Assets 801 labeled A1 to An are desired to be monitored and/or protected against gunfire. Again assets could be buildings, crowds, pressurized tanks, livestock, airplanes, wildlife, or anything of value that maintains a presence in the controlled area for a significant time. An area 802 encompasses these assets and adjacent areas from which guns could be fired. A line of demarcation 803 is set, dividing the area between a region that is controlled and a region that is uncontrolled. Controlled in this context means monitored, access-controlled, surveilled, patrolled, or otherwise actively or passively maintained for the protection of assets 801. For example, where assets include buildings, these buildings are kept free of vegetation and other obstructions so a clear view can be maintained for security personnel, police officers and/or cameras. Similarly the brush and grass can be cut down for a firebreak. An uncontrolled area may contain trees, brush and other concealments 804 where a gunman might hide or take cover. A line of demarcation could be a property line between a property owned by a party upon which assets 801 sit, and an adjacent property where the owner has no right to enter or make improvements. An uncontrolled area could also be a location on the owner's property where the zoning laws require landscaping, walls, green spaces or other restrictions. The line of demarcation could also be set between very controlled and relatively uncontrolled areas, such as the boundary between a courthouse site and a public right-of-way. The line of demarcation could also be fuzzy between an area that flows gradually from a controlled to lesser-controlled state. A line of demarcation 803 and controlled/uncontrolled zones are useful for some installations, but not required for all.

In this example, a sequence of uniform unidirectional gunshot sensors 805 are placed near line of demarcation 803 inside the controlled area. These sensors are preferably mounted above the ground upon poles or other structures to enhance their effective range. Additional sensors could be positioned inside the controlled or the uncontrolled areas, enhancing the gunshot detection coverage and accuracy. For example, two or more rows of sensors may be efficiently used, located at the intersections of an isometric (triangular) grid or some other regular two-dimensional pattern. With that in mind, and with the object of keeping this discussion simple, the example of FIG. 8 is chosen to represent a simple installation of one row at a minimal cost. Preferably, sensors 805 are set at a maximal distance "D" which puts each sensor within the detection range of an adjoining one in the sensor row. Preferably there are no distances between adjoining sensors 805 greater than D, as this could create gaps in coverage, although the remainder of the network would function normally. As distance D is made smaller, the accuracy of gunshot detection and location is generally increased because there will more likely be a sensor that picks up the gunshot with a strong energy envelope. Thus, for installations requiring increased accuracy, the distance D could reasonably be expected to be about one-third to two-thirds the detection range of an individual sensor. A central device 806 is placed within wireless range of sensors 805 at a convenient location, for example on the side of one of assets 801.

Figure 9:
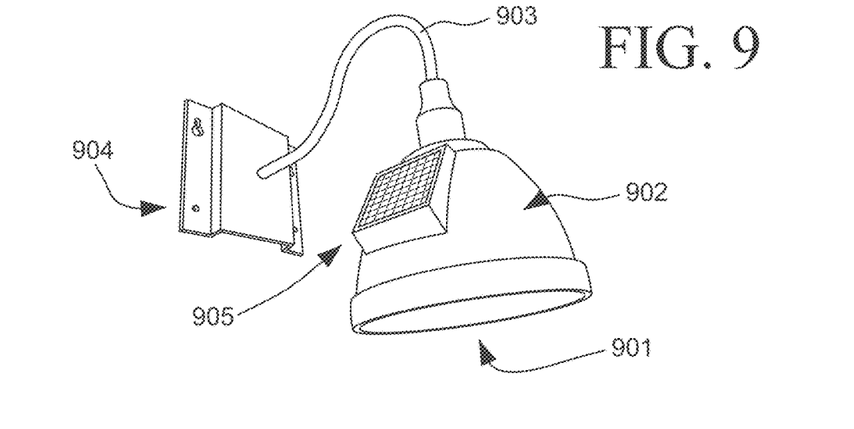
FIG. 9 is an image of an exemplary wall- or pole-mounted gunshot sensor.

A unidirectional sensor may take the exemplary form shown in FIG. 9 as seen from the outside. The internal structure can vary, but generally the gunshot detection microphone(s) will be positioned to face opening 901 inside of resonator 902, to enhance the pickup of gunshot audio at a distance. A standoff bracket 903 positions the resonator with the opening pointed downward at some distance from mount 904. A solar cell 905 may be included to charge internal batteries, if they are rechargeable, reducing the maintenance required for the sensor. Other components, discussed generally in connection with FIG. 2, are positioned within resonator 902 as convenient. An outdoor gunshot sensor is preferably weather-resistant, sloughing off precipitation that may fall upon it and withstanding stresses from wind and occasional flying-object strikes.

Point of Impact Determinations

It is sometimes desired to locate the areas where a round may have impacted on or near an asset. For example, an airline would want to know which of its aircraft to inspect for damage after a gunshot event. The sound and corresponding energy of an impact is ordinarily much smaller than the discharge of the gun, and can vary with projectile mass, velocity, material, the angle of impact and many other factors. Thus this has been a challenging problem to solve. Nonetheless, from a unidirectional gunshot detector array, it is possible to narrow possible trajectories down to probable ones.

A simple method to finding a trajectory and potential points of impact is to begin with a calculated gunshot position, for example G2 in FIG. 7, and calculate a vector that is orthogonal to the line of demarcation 650. The vector can then be rotated some number of degrees, for example 30 degrees, resulting in a sweep of possible angles. A distance limit can be pre-set, which is the greatest distance from a gunshot considered potentially damaging. This limit should be set for the weapons likely to be encountered. For example, in an urban environment, where an actor would want to conceal his weapon, the likely weapons are handguns with a downrange damage potential of perhaps 200 meters. For a rural environment, a good value might be 500 meters, to account for rifles at longer distances. Intersecting the sweep with a circle of a radius of the distance limit results in a geometric area, and assets within that area indicate the places of possible impact for inspection. This method may be satisfactory for some usages, where impact locations are easily observed on a uniform wall or other surface.

More sophisticated ways of finding a trajectory are possible from energy later in a gunshot candidate. Returning to FIG. 5, the beginning "crack" portion of the envelope is produced from the discharge of the firearm, and for some number of milliseconds, with the projectile close thereby. As the round travels forward, and as the envelope transitions into the decay portion, the projectile will change position. For an arrangement with a demarcation line as discussed, this movement will be toward the sensors. This yields an early portion of the energy envelope, beginning with an "Impulse to Decay Threshold" and ending at some time following as the projectile passes, where there is a substantial portion of energy imparted to the microphone from the shock wave and other noise made by the projectile. In an alternative method, rather than waiting for the envelope to decay to a threshold, an equivalent pre-defined time segment can be set that begins where envelopes are likely to contain an energy captured from a passing projectile. Either way, enough samples are included in the envelope after-impulse segment to statistically determine a ratio, which could represent about 0.2 seconds or less.

Where a projectile passes equidistantly between two sensors, and after subtracting the impulse contribution, the ratio of energy received is equal. An increase in the ratio toward one sensor or the other, in this portion from the impulse, will indicate a trajectory closer to the favored sensor. From this the trajectory of the projectile can be refined, as well as the probable zones of impact. The relative angle of this trajectory against energy readings from pair of sensors can be measured under controlled circumstances, from various gunshot positions and directions, from which tables and equations can be fashioned, for use in best-fit or interpolative methods in real practice. Once fashioned, these calculations can be performed in service by any device receiving a waveform, energy measurements or derivatives thereof, which could be at a central device 300, a gateway 400, or a server computer 402 potentially in the cloud.

Positional Displays of Detected Gunshots

Gunshots, trajectories and points of impact are advantageously displayed against a geospatial map or other representation, so notification and remedial action can be rapidly taken. The translation of the relative position of two or more detecting sensors, generated above, can be done automatically with sensor locations annotated on a map, as described in the '330 Patent. The location and trajectory of a gunshot on a map can be made from a sensor-relative position through common rotational and scaling operations. A representation can then be made on a display, with the location and trajectory overlayed upon the map image.

Figure 10:
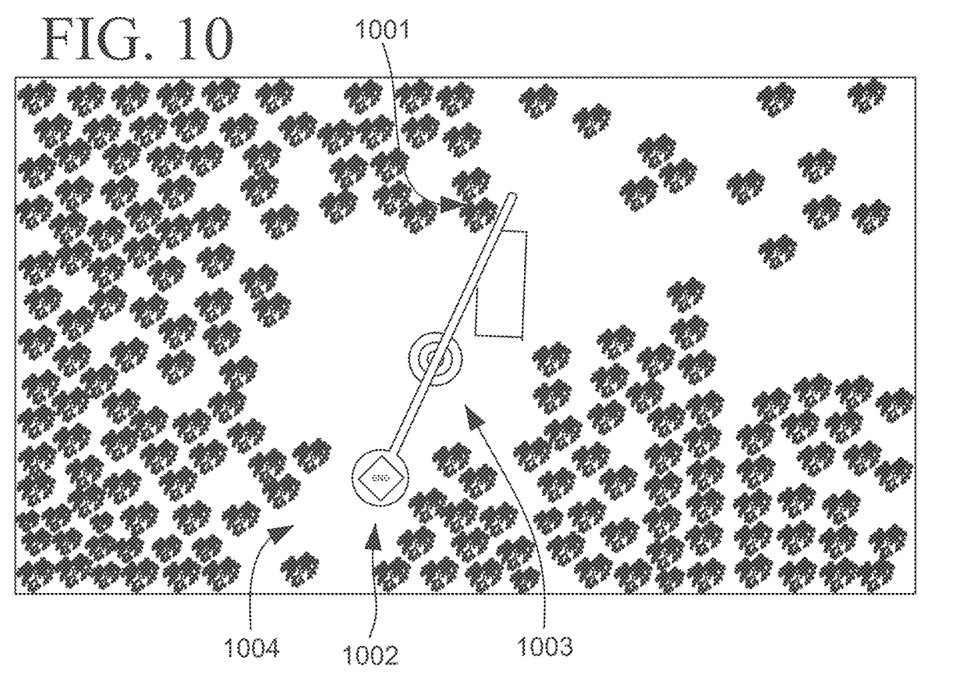
FIG. 10 is an exemplary view of the position, trajectory and potential location of impact overlaid on an image of a gun range.
Figure 11:
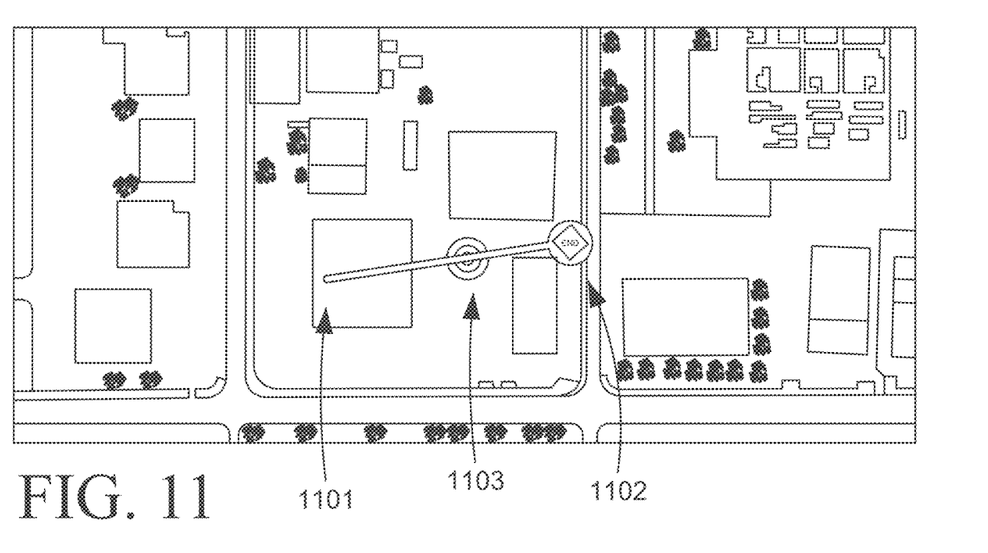
FIG. 11 is an exemplary view of the position, trajectory and potential location of impact overlaid on an image of an urban environment.

Two representative screen images captured from testing operations appear in FIGS. 10 and 11, with FIG. 10 being from a shot at a target range and FIG. 11 being from blank ammunition in an urban area. In FIG. 10, the top of the line 1001 starts near a sheltered bench at the range, showing the location of the gunshot. The trajectory is found to pass to or near location 1002, marked with an "END" icon. The crosshairs mark 1003 shows the general location of the sensors for the test. In the image, the termination of the projectile is near the berm making a backstop at the range. For the urban setting of FIG. 11, the gunshot location 1101 is too far to the right, due to the inaccuracies discussed above for a two-sensor network. Nevertheless, the line passes through the location of the shooter, past sensors near 1103, end ending at position 1102. The representations in FIGS. 10 and 11 are exemplary, and these representations may be varied to use location and trajectory information other than lines and icons as desired.

Multiple Gunshots

In any gunfire detection system combining the audio energy received at multiple sensors, the possibility exists of a set of rapid gunshot candidates transmitted from some sensors but not at others. In a system that uses energy, such as those described above, confusing one shot for another is of no consequence to position- and trajectory-finding where the same envelope is produced at the same location by the same firearm facing the same direction. For a single shooter, gunshots will originate at the same spot on the ground, so errors in correlation between gunshots will usually be tolerable. Difficulties can arise where a shooter fires from a moving platform, or where two shooters fire alternating shots.

Referring back to FIG. 7, a gunshot G2 in proximity to sensors S1 and S2 could be confused by a separate gunshot close to S3. Recall that these sensors are extremely low-power, waking up infrequently to synchronize time, if they do it at all. Because of the hazard of drifting real-time clocks on board the sensors, the time difference of arrival method cannot immediately be used for gunshot location, because any timestamps on communications or gunshot candidates are not reliable down to the fraction-of-a-second scale.

There are however, when processing a sequence of rapid gunshots occurring in a timescale of minutes, ways in which gunshot candidates can be correlated between sensors with drifting clocks, upon which location and trajectory determinations can be made. These gunshot sensors can report gunshot candidates with timestamps relative to their internal real-time clocks. Although the accuracy of these clocks is not sufficient to prevent unacceptable drift over hours or days, the accuracy is sufficient to calculate the interval between rapid gunshots with high precision. A relatively simple computation can be made of the interval between gunshot candidates detected by a single sensor, and the fitting of these intervals to the candidates of a different sensor will yield a correlation of candidates on one sensor to a different one. Even with a brute-force best-fit approach, this fitting is well within the processing power of an ordinary computer in real-time. Recognizing that this method, and perhaps others, of correlating gunshots is useful to calculate more reliable energy ratios for finding the locations and trajectories of gunshots, the reader is directed to use proper judgment in the inclusion and use of such methods in the technology described herein.

Gunshot Location-to-Display Processing Methods

A central device, such as that of FIG. 3 or 4, collects gunshot candidates from sensors, and may perform processing to eliminate unnecessary, confusing and/or duplicative information, and otherwise present information that can be more readily acted upon by a human, optionally in conjunction with other devices supplying user-interfaces and displays.

Figure 12:
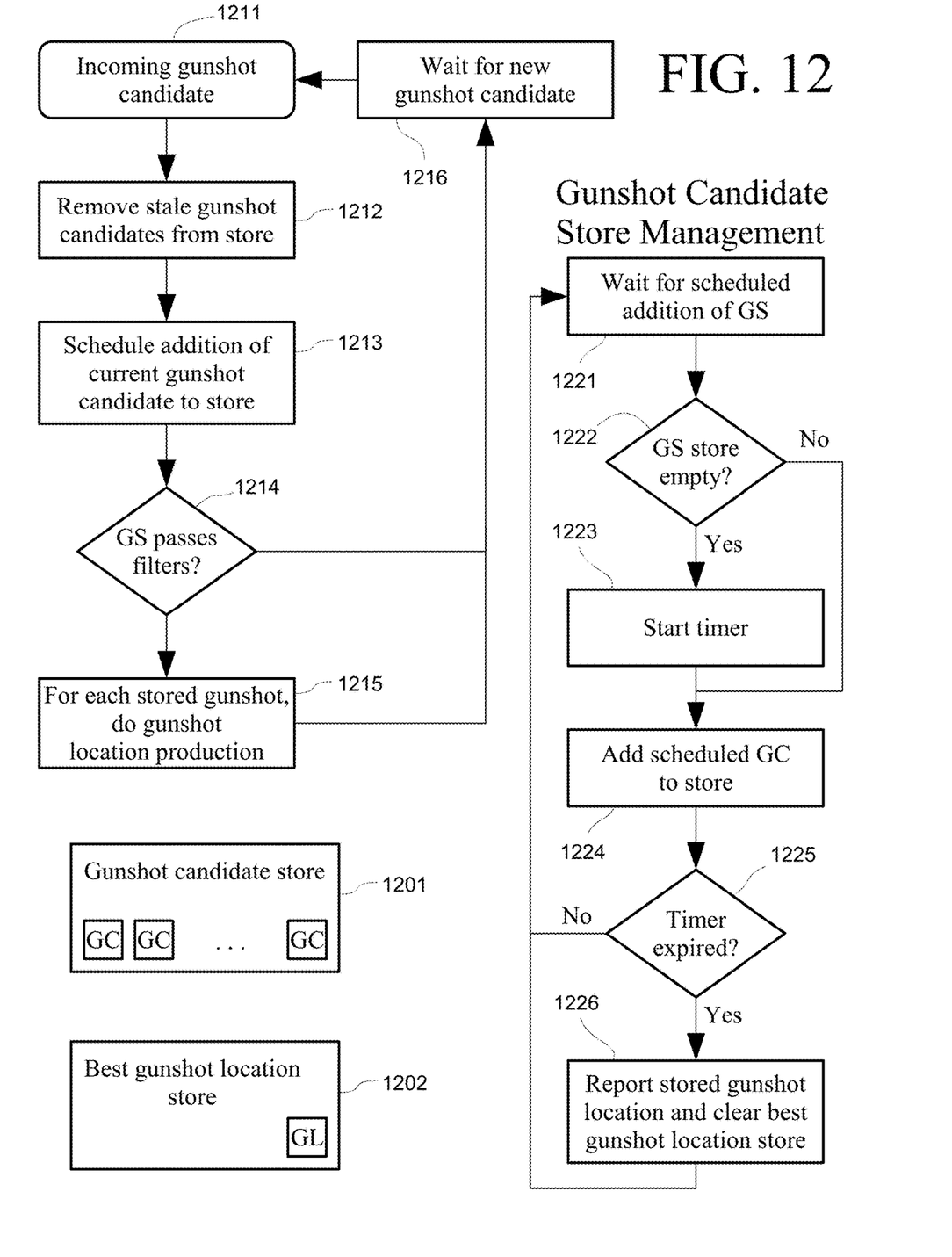
FIG. 12 is a flowchart of an exemplary method of managing gunshot candidates and reporting gunshots at a central device.
Figure 13:
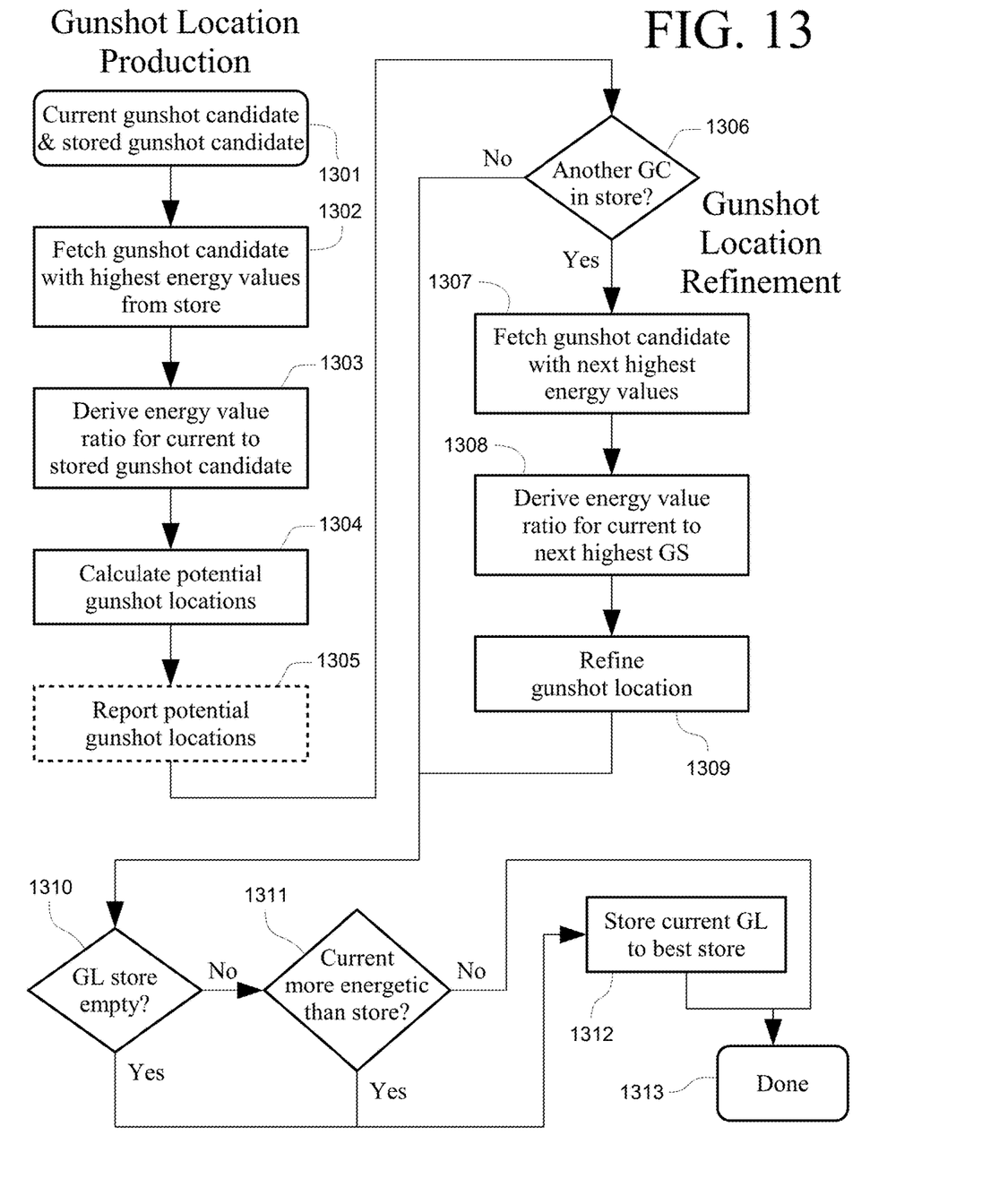
FIG. 13 is a flowchart of an exemplary method of refining a gunshot location and arriving at a best location from a plurality of gunshot candidates.

In view of the discussion above, FIGS. 12 and 13 depict an exemplary processing method designed to provide good location performance under general circumstances for marking the position of origin of gunshots and optionally trajectories of projectiles therefrom. It is to be understood that although this method can be practiced at a central device, portions of the method can be performed at other locations upon intermediate data structures as results as convenient. First referring to FIG. 12, this method uses two stores. A gunshot candidate store 1201 may contain a set of recently-received gunshot candidates, particularly as gunshot candidates are incoming from sensors during a gun-related incident. In this method, a store 1202 may store the best gunshot location, "best" in this context is the quality of having the highest accuracy, which may ordinarily be the location calculated from the closest sensors to the gunshot, which will correspond to the gunshot candidates having the largest energy values.

In the method of FIG. 12, the central device waits for a incoming gunshot candidate 1211 from a sensor. On this event, a process or processor may awaken if it is put into the background or otherwise asleep. Upon awakening, it is convenient to remove stale gunshot candidates from store 1201, although this can occur at any time and is shown in this sequence for simplicity. "Stale", in this context, means having arrived within a short period of time set for the array, which period may be about the time required for all sensors in the array to detect a gunshot and transmit a corresponding gunshot candidate, for example 0.5-3.0 seconds. This simple way of reducing potential combinations of correlated gunshot candidates may be applied under general circumstances; more sophisticated methods may also be applied for environments where gunfire from two shooters at two locations, or more frequent shots might occur simultaneously.

A received gunshot candidate will be scheduled to be stored 1213. The candidate or elements thereof will be stored with a timestamp at about the time of receipt or scheduling to detect when it has become stale in the store, as well as energy values of the candidate. The candidate could be immediately stored, if precautions were taken not to correlate a gunshot candidate with itself in the succeeding operations, avoiding the production of inaccurate and erroneous locations.

Filters are then applied to the gunshot candidate 1214, which classify the candidate as a gunshot or a false alarm. If the candidate is not deemed to be from a gunshot, the method can wait for the next gunshot candidate 1216 and repeat. Note that although a gunshot candidate may not pass the application of filters 1214, it may still be useful for gunshot location production described below. A candidate that passes filters 1214 will be paired with each stored gunshot present at the time in store 1201, which pairing produces a potential gunshot location 1215, described further below.

Also in this method is a separate process, thread, task or other parallel steps which manages the gunshot candidate store 1201, and generally reports the best gunshot location from store 1202 at appropriate times to a point of use. This thread runs in a loop, receiving a signal that a gunshot candidate is to be added 1221 to store 1201. At the time the signal is received, if the store 1201 is empty 1222, a timer is started 1223. The gunshot candidate is added to the store 1224, and following a short delay to allow for location production, the timer is then checked for expiration 1225. This timer is considered to have expired at about the same "stale" period discussed above, upon which all the gunshot candidates sent from the sensor network are assumed to have arrived and the best location of the originating gunshot having been computed. When the timer expires, the gunshot location in store 1202 is sent to the point of use, and the best gunshot location store 1202 is cleared 1226.

The gunshot location production 1215 of the exemplary method is further described in detail in FIG. 13. It begins with a current gunshot candidate and the stored gunshot candidates in store 1201. The store 1201 is reviewed to find the earlier-received gunshot candidate with the greatest energy, which is generally the one with the highest energy value or values, corresponding to a sensor close to the originating gunshot. From that found candidate, a ratio is derived between the current and the found energy values 1303. Using the methods described above, potential gunshot locations are calculated 1304, which may be a region having the form of an arc or a curve. At this point, usable gunshot locations are available and may optionally be reported 1305.

If desired, further refinement to the gunshot position can be made, where there is another gunshot candidate in the candidate store 1306. Where there is more than one candidate remaining to be selected, the one having the next highest energy values may be fetched 1307, and a ratio of the energy value in the current candidate against this fetched one produced 1308. The gunshot location can then be further refined 1309 using methods as given above, for example finding the intersection of curves.

At the time a refined gunshot location is produced, it is not known whether another candidate will arrive allowing for a better and/or more accurate location to be calculated. Delays in the transmission of candidates from sensors can arise from interference or conflicts over a wireless channel, for example. The remainder of the steps in FIG. 13 in combination with the gunshot candidate store management of FIG. 12 provide for a delay, giving all the gunshot candidates that will be received to be considered.

Having a refined gunshot candidate produced 1309, it will be stored 1312 in the best location store 1202 under two circumstances. First, if store 1202 is empty, the produced location is stored, as it is the best one known at the time. Second, if store 1202 contains an earlier-stored location, it will be replaced if the produced one is more "energetic", meaning originating from higher energy values. This may mean that the energy values from the three gunshot candidates used to compute the produced refined gunshot location are greater than the corresponding energy values of the stored location. The best known gunshot location is then in store 1202 and may be sent as described in connection with FIG. 12.

When a gunshot location is reported 1226, that location is relative to the sensors producing gunshot candidates and their containing sensor array. Communication of a potential gunshot location, optionally with a trajectory, may be to a separate server, process, thread, a subroutine of an executable program, or other location of use. The receiver of that communication may then present this location information for human consumption. In an exemplary method, the receiver of a detected gunshot including this relative location information may maintain a store of detected gunshots, occurring in the past to some selected interval. This interval can be as long as convenient, and this store can be cleared on a regular schedule or through the pressing of a widget on a screen or some other act. This does not preclude the keeping of a log of received gunshots and their locations, which may be used to produce a historical representation at some time in the future.

For gunshots within the interval, these can be translated into coordinates on the ground with respect to the site, to latitude and longitude, or some other locational scheme that does not depend upon the location of the sensors. Translations can also be made to an image containing an overhead view or map of a site or portions thereof. That can be done by copying the image and modifying it, overlaying the locations of translated gunshot positions with an icon or other marker at the image-relative location. Where a location is a region, the marker can be a field in an appropriate shape, or a collection of points within that region. The image may be further overlaid with other information, for example textual gunshot position and time information, or other elements of a monitoring interface. Where a trajectory has been found, a zone of impact may be calculated and known assets highlighted as being at risk of damage.

The methods of waveform processing and filtering as described in the '330 Patent may be generally employed in the systems and methods described herein, as well as system alerts and actions.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. The exact configurations described herein need not be adhered to, but rather the diagrams, components, assemblies, systems, architectures and methods described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system for monitoring an area containing sited assets and alerting to the presence and location of gunfire, said system comprising:
   an arrayed network comprising at least two sensors, each of said sensors comprising a microphone, a microcontroller comprising non-volatile memory, a battery, a wireless transceiver and an antenna;
   a central device comprising a wireless transceiver and an antenna configured for communication with said sensors, said central device further comprising a microprocessor functional to access non-volatile memory, said central device further comprising a communication port operable to supply gunshot location information to a destination;
   wherein each of said sensors is operable to:
   (a) monitor the audio energy in its vicinity,
   (b) take repeated samples from said microphone and compute at least one energy value, and
   (c) wirelessly transmit a gunshot candidate to said central device comprising the computed energy values;
   further wherein said central device is operable to:
   (d) receive gunshot candidates each comprising at least one energy value,
   (e) correlate gunshot candidates arriving from both sensors to single potential gunshot events,
   (f) derive a ratio from a comparison of the energy values within correlated gunshot candidates,
   (g) from derived ratios of energy values, calculate potential locations of a gunshot event, and
   (h) communicate gunshot location information to a destination, over said communication port;
   wherein said central device is located within wireless communication range of each of said sensors.

2. A system as recited in claim 1, wherein said arrayed network comprises at least three sensors, and further wherein said central device is operable to:
   (i) correlate gunshot candidates arriving from all of said three sensors, said correlating producing correlated gunshot candidates associating a gunshot candidate originating from each sensor originating from the same potential gunshot,
   (j) for a correlated gunshot candidate, identify the sensor transmitting the greatest energy value,
   (j) derive a pair of ratios of correlated energy values from the identified sensor to the other of said three sensors, and
   (k) from the pair of ratios, calculate a point location of a gunshot event.

3. A system as recited in claim 1, further wherein said central device is operable to apply timestamps to incoming gunshots from said sensors, and further wherein in the course of correlating one gunshot candidate to a second gunshot candidate, said central device calculates the difference in time between the arrival of the first and second gunshots, and further said central device finds correlation only where the difference in time is below a maximal interval threshold.

4. A system as recited in claim 1, further wherein each of said sensors comprises a real-time clock, further wherein each of said sensors is operable to include a timestamp referenced from its real-time clock within a gunshot candidate before it is transmitted, and further wherein said central device is operable to calculate the difference in timestamps within gunshot candidates from the same sensor, and further wherein said central device is operable to resolve best correlations between gunshot candidates from two or more of said sensors.

5. A system as recited in claim 1, further wherein each of said sensors is configured to enter a low-power sleep mode following the transmission of a gunshot candidate.

6. A system as recited in claim 1, wherein said communication port of said central device is a network transceiver providing a network connection over a physical or a wireless connection.

7. A system as recited in claim 1, wherein said central device is operable to provide an interface to clients on a local area network.

8. A system as recited in claim 7, wherein said central device is operable to present a visual representation of a resolved gunshot event location overlayed upon a map of a controlled area containing protected assets.

9. A system as recited in claim 1, wherein each of said sensors is configured to communicate wirelessly through a long-range network, and said central device is distant from the site where said sensors are located.

10. A method of resolving gunshot candidates to gunshot event locations within a monitored area, the monitored area having located thereto an array of a plurality of gunshot sensors, each gunshot sensor functional to sample the audio energy in its vicinity and detect potential gunshot events, each sensor further functional to convert the energy envelope of a potential gunshot event into a gunshot candidate comprising at least one energy value, said method comprising the steps of:
   receiving gunshot candidates from a plurality of gunshot sensors, each gunshot candidate containing an energy value;
   correlating gunshot candidates arriving from a pair of gunshot sensors within a specified interval to potential gunshot events;
   for potential gunshot events, deriving a ratio representing the magnitude of energy values at the first in a pair of gunshot sensors against the magnitude of energy values at the second in the pair;

calculating potential locations of a gunshot event from a derived ratio, and communicating calculated gunshot location information to a location of use.

11. A method according to claim 10, wherein the calculating of potential locations yields a curve corresponding to the derived ratio.

12. A method according to claim 10, further wherein the monitored area is divided into a controlled and an uncontrolled area, said method further comprising the steps of:

correlating gunshot candidates arriving from three gunshot sensors within a specified interval to potential gunshot events;

for a correlated triplet of gunshot candidates arriving from three separate gunshot sensors, identifying the sensor originating the candidate having the greatest energy value;

deriving a pair of ratios of correlated energy values from the identified sensor to each of the two energy values originating from the non-identified sensors;

from a derived pair of ratios, calculating potential point locations of a gunshot event, each point location relative to the originating sensors;

reporting the location of each gunshot event only if the location is calculated to be within the uncontrolled area.

13. A method according to claim 12, wherein the calculating of potential point locations is performed by calculating the points of intersection of the two curves corresponding to the derived pair of ratios.

14. A method according to claim 10, wherein within each gunshot candidate are two energy values, the first being calculated early in the energy envelope and the second being calculated using audio samples later in the energy envelope timed to be likely to capture the energy of a passing projectile, with said deriving a ratio being performed on the first energy values from correlated gunshot candidates producing a first ratio, said method further comprising the steps of:

calculating a further projectile-passing ratio from the second energy values;

using a comparison of the first ratio against the projectile-passing ratio, calculating a trajectory of the projectile for a gunshot event.

15. A method according to claim 14, wherein said calculating a trajectory is by a best-fit or interpolative method against captured data under controlled circumstances.

16. A method according to claim 10, further comprising the step of applying false-alarm filters prior to said step of deriving a ratio.

17. A method of displaying gunshot location information for a site having installed thereto a sensor array, comprising the steps of:

making a connection to a server containing an image comprising a two-dimensional representation of a site, the server also containing location information of sensors relative to the two-dimensional representation of the site, the server operable to translate the relative location information of a gunshot to a location on the contained image, the server being operable to overlay a marker at the translated location of a gunshot upon the contained image, the server being operable to deliver an image of a site upon which is marked the location of a gunshot;

receiving an image comprising a two-dimensional representation of a site upon which is overlayed a marker at the location of a gunshot, the location marker being placed at the location of a gunshot computed from energy values of correlated gunshot candidates received from a plurality of gunshot sensors; and displaying the image on a human-readable screen.

18. A method as recited in claim 17, wherein said step of receiving receives an image containing a location marker placed at the location of an intersection of two curves, each curve representing potential gunshot locations from a pair of ratios of energy values between two proximal sensors.

19. A method as recited in claim 17, wherein said receiving and said displaying are by means of an HTTP browser.

20. A method as recited in claim 17, wherein said receiving receives an image upon which is marked a gunshot trajectory.

21. A method as recited in claim 17, wherein said receiving receives an image upon which is marked a projectile impact zone.

22. A method as recited in claim 17, wherein:

said making a connection to a server is to a server containing location information of assets, the server being operable to apply an impact zone from a gunshot location and trajectory onto the image comprising a two-dimensional representation of a site, the server being operable to overlay highlights of contained assets within an impact zone of a gunshot event;

said receiving receives an image upon which are highlighted assets within a computed projectile impact zone.

23. A method as recited in claim 17, wherein said receiving an image receives an image upon which are overlayed the location of sensors.

24. A method as recited in claim 23, wherein said receiving an image receives an image upon which are overlayed the energy levels of a gunshot event to a plurality of detecting sensors.

25. A method as recited in claim 17, wherein said receiving an image receives an image upon which are overlayed a line of demarcation between a controlled and an uncontrolled area.

* * * * *